(12) United States Patent
Katschorek et al.

(10) Patent No.: US 7,771,629 B2
(45) Date of Patent: Aug. 10, 2010

(54) METHOD AND FILM SYSTEM FOR PRODUCING A PERSONALISED, OPTICALLY VARIABLE ELEMENT

(75) Inventors: Haymo Katschorek, Obermichelbach (DE); Werner Reinhart, Zirndorf (DE); Mathias Seitz, Buckenhof (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 1026 days.

(21) Appl. No.: 10/570,111

(22) PCT Filed: Sep. 9, 2004

(86) PCT No.: PCT/DE2004/002018

§ 371 (c)(1),
(2), (4) Date: Mar. 1, 2006

(87) PCT Pub. No.: WO2005/029135

PCT Pub. Date: Mar. 31, 2005

(65) Prior Publication Data

US 2007/0014936 A1  Jan. 18, 2007

(30) Foreign Application Priority Data

Sep. 16, 2003  (DE) .............................. 103 42 674

(51) Int. Cl.
*B29D 11/00* (2006.01)
(52) U.S. Cl. ................... 264/1.31; 264/1.34; 264/1.38; 264/1.7; 264/2.7; 428/1.1
(58) Field of Classification Search .............. 264/1.1, 264/1.31, 1.32, 1.34, 1.7, 1.36, 1.38, 2.7; 428/1.1
See application file for complete search history.

(56) References Cited

U.S. PATENT DOCUMENTS

| 5,601,884 A | 2/1997 | Ohnishi et al. |
| 5,903,330 A | 5/1999 | Funfschilling et al. |

(Continued)

FOREIGN PATENT DOCUMENTS

JP  08-005839  1/1996

(Continued)

OTHER PUBLICATIONS

Office Action dated Sep. 16, 2009 from Japanese Patent Application No. 2006-526511 (cited art on p. 3).

*Primary Examiner*—Mathieu D. Vargot
(74) *Attorney, Agent, or Firm*—Hoffmann & Baron, LLP

(57) ABSTRACT

The invention concerns a process for the production of a personalised, optically variable element having polarising properties, and a film system for carrying out the process. To produce the optically variable element a film body which comprises two or more layers and which has an LCP layer comprising a liquid crystal material is applied to a substrate body which has an orientation layer for the orientation of liquid crystals. The orientation layer of the substrate body is personalised prior to application of the film body to the substrate body. The film body is then applied to the personalised orientation layer of the substrate body in such a way that the LCP layer of the film body lies on the personalised orientation layer of the substrate body for then orientation of liquid crystals of the LCP layer of the film body.

16 Claims, 6 Drawing Sheets

U.S. PATENT DOCUMENTS

| | | | |
|---|---|---|---|
| 7,201,948 B2 * | 4/2007 | Moia et al. | 428/1.1 |
| 2003/0142256 A1 | 7/2003 | Maeda et al. | |
| 2005/0042391 A1 * | 2/2005 | Ryan et al. | 428/1.1 |

FOREIGN PATENT DOCUMENTS

| | | |
|---|---|---|
| JP | 09-179126 | 7/1997 |
| JP | 2000-314810 | 11/2000 |
| JP | 2003-215342 | 7/2003 |
| RU | 2204179 | 5/2003 |
| RU | 2001106515 | 5/2003 |
| WO | 9927398 | 6/1999 |
| WO | 0229452 | 4/2002 |
| WO | 02063660 | 8/2002 |

* cited by examiner

METHOD AND FILM SYSTEM FOR PRODUCING A PERSONALISED, OPTICALLY VARIABLE ELEMENT

CROSS-REFERENCE TO RELATED APPLICATIONS

This application is a National Phase application of International Application No. PCT/DE2004/002018 filed Sep. 9, 2004, which claims priority based on German Patent Application No. 103 42 674.4, filed Sep. 16, 2003, which are both incorporated herein by reference.

BACKGROUND OF THE INVENTION

The invention concerns a process for the production of a personalised, optically variable element with polarising properties, and a film system comprising a substrate body and a film body for providing a personalised, optically variable element having polarising properties.

EP 1 227 347 A1 describes a production process for a personalised, optically variable element having polarising properties.

That process provides for printing on to a substrate by means of an ink jet printer a first orientation layer which can be aligned in a given orientation direction by irradiation with polarised light. A layer comprising a liquid crystal material is then applied to the orientation layer by means of an ink jet printer, and conditions are afforded under which the liquid crystal material is aligned. The liquid crystal layer is then hardened with UV light.

In order to produce personalised regions having different polarisation properties, the orientation layer comprising a photopolymer and the layer comprising a liquid crystal material are applied only in region-wise manner, under the control of a computer, in respective individual regions, to the substrate layer using the ink jet printer. In addition the following procedure is proposed for that purpose:

A first orientation layer is printed on the substrate in pattern form by means of the ink jet printer. The substrate is then irradiated with linearly polarised light, thereby achieving suitably uniform orientation of the photopolymer layer in pattern form. A second photopolymer layer is then applied in accordance with a second pattern with the ink jet printer and then irradiated with linearly polarised light. The polarisation directions of the first and second radiation differ so that the result afforded is orientation layers involving different orientations, which are arranged in mutually superposed relationship. That multiple coating procedure in combination with a configuration, of suitable pattern shape, of the individual polymer layers which are arranged in mutually superposed relationship makes it possible to produce regions involving different orientations.

SUMMARY OF THE INVENTION

The object of the present invention is now to improve the production of a personalised, optically variable element having polarising properties.

That object is attained by a process for the production of a personalised, optically variable element having polarising properties, wherein to produce the optically variable element a film body which comprises two or more layers and which has an LCP layer comprising a liquid crystal material is applied to a substrate body which has an orientation layer for the orientation of liquid crystals, wherein the orientation layer of the substrate body is personalised prior to application of the film body to the substrate body, and wherein the film body is applied to the personalised orientation layer of the substrate body in such a way that the LCP layer of the film body lies on the personalised orientation layer of the substrate body for orientation of liquid crystals of the LCP layer of the film body. The object of the invention is further attained by a film system comprising a substrate body and a film body, wherein the film body of the film system comprises two or more layers and has an LCP layer comprising a liquid crystal material, wherein the substrate body of the film system has an orientation layer for the orientation of liquid crystals, and wherein the film body after personalisation of the orientation layer of the substrate body is applied to the personalised orientation layer in such a way that the LCP layer of the film body lies on the personalised orientation layer for the orientation of liquid crystals of the LCP layer of the film body.

The invention achieves the advantage that inexpensive, decentral personalisation of LC security elements (LC=liquid crystal) is made possible. Personalisation of optical security elements is possible in a decentral mode at a low level of apparatus complication and expenditure, in which case at the same time a personalised, optically variable security element is produced, which in terms of its copying safeguard, resistance to abrasion wear and handleability, is equal in every way to an optically variable security element manufactured in mass production. Further advantages are achieved by virtue of the fact that apparatuses which are already in existence for the decentral personalisation of security elements can be used at a low level of refitment complication and expenditure for carrying the process according to the invention into effect, thereby achieving further cost advantages.

Advantageous configurations of the invention are set forth in the appendant claims.

The film body preferably has a carrier layer and a physically dried but not yet cross-linked LCP layer. That guarantees that the process according to the invention takes place quickly and smoothly. Immediately after application of the film body to the substrate body, it is possible to effect alignment of the liquid crystal material of the LCP layer of the film body to the personalised orientation layer of the substrate body. For that purpose preferably the LCP layer of the film body is liquefied after application of the film body by thermal heating so that alignment of the liquid crystals of the LCP layer of the film body to the personalised orientation layer of the substrate body takes place. As the non-cross-linked physically dried LCP layer is sticky, a bond between the film body and the substrate body can be achieved by way of adhesion.

After alignment of the liquid crystal molecules of the LCP layer the LCP layer is fixed for example by means UV hardening. Thermally cross-linkable systems or systems which are liquefied under the effect of temperature are also a possibility.

In that respect further advantages can be achieved if the orientation layer of the substrate body has UV-functional groups. After fixing of the LCP layer by UV hardening those groups provide for an even stronger bond, for example by chemical bonding, between the film body and the substrate body.

In accordance with a preferred embodiment of the invention the substrate body has one or more further layers which generate optical security features. Layers of that kind can have for example diffractive structures which afford optical-diffraction security features, for example holograms. In addition those layers can be thin film layers which provide colour shifts which are dependent on the viewing angle, by means of interference phenomena. In that case, besides the substrate body, the film body or the substrate body and the film body may also have such layers.

The safeguard against forgery of the optically variable security element is greatly improved by those additional layers which are preferably arranged above the LCP layer, that is to say between the viewing person and the LCP layer. The security elements can no longer be copied or imitated by simple apparatuses, for example an ink jet printer and a UV lamp with polariser. The security standard is particularly high in that respect if both the substrate body and also the film body have layers of that nature. The personalised security feature is thus protected on both sides and any attempt at manipulating a security element influences one of the other security elements and is thus apparent.

A particularly high degree of security is afforded in that case if the substrate body and the film body each have one or more further layers which generate mutually supplemental optical security features.

The orientation layer of the substrate body can be personalised by various measures.

It has proven to be particularly advantageous in that respect for the orientation layer of the substrate body to be personalised by partial printing on the orientation layer. That printing operation causes the grooves of the orientation layer to be partially filled so that no orientation of the LCP layer takes place in the printed region. That procedure enjoys the advantage that the apparatus complication and expenditure for personalisation of the orientation layer is particularly low. In addition in that way a plurality of apparatuses which are already available can be easily used again, at a low level of modification expenditure, for the production of personal documents (for example data cards).

A further advantageous possible option for personalisation involves personalising the orientation layer of the substrate body by partial transfer of a differently oriented orientation layer on to the orientation layer of the substrate body. On the orientation layer, that results in regions involving a different orientation, whereby quite complex personalised security features can be produced.

Further possible ways of personalising the orientation layer involve personalising the orientation layer by partial mechanical removal of the orientation layer, by laser ablation, by partial thermal deformation of the orientation layer, by partial replication of a relief structure in the orientation layer or by partial exposure of the orientation layer.

It is particularly advantageous to use a stamping film, laminating film or sticker film as the film body. A film of that kind can be applied to the substrate for example by means of a conventional hot stamping or laminating process. The use of films of that kind as the film body ensures that the process can be quickly and reliably carried into effect. In addition apparatuses which are already in existence, for example laminating apparatuses, can be used again.

It is also possible to use a stamping, laminating or sticker film as the substrate body, thereby affording the above-indicated advantages. In that respect it has proven to be advantageous for the stamping, laminating or sticker film forming the substrate body to be applied prior to application of the film body to the substrate body, to a security element, for example a passport, a banknote, a charge card or a ticket.

In the simplest case however it is also possible for the substrate body to comprise for example a carrier layer forming a security document, and the orientation layer which is (partially) applied thereto.

BRIEF DESCRIPTION OF THE DRAWINGS

The invention is described by way of example hereinafter by means of a plurality of embodiments with reference to the accompanying drawings in which.

DETAILED DESCRIPTION OF THE INVENTION

Figure 1:
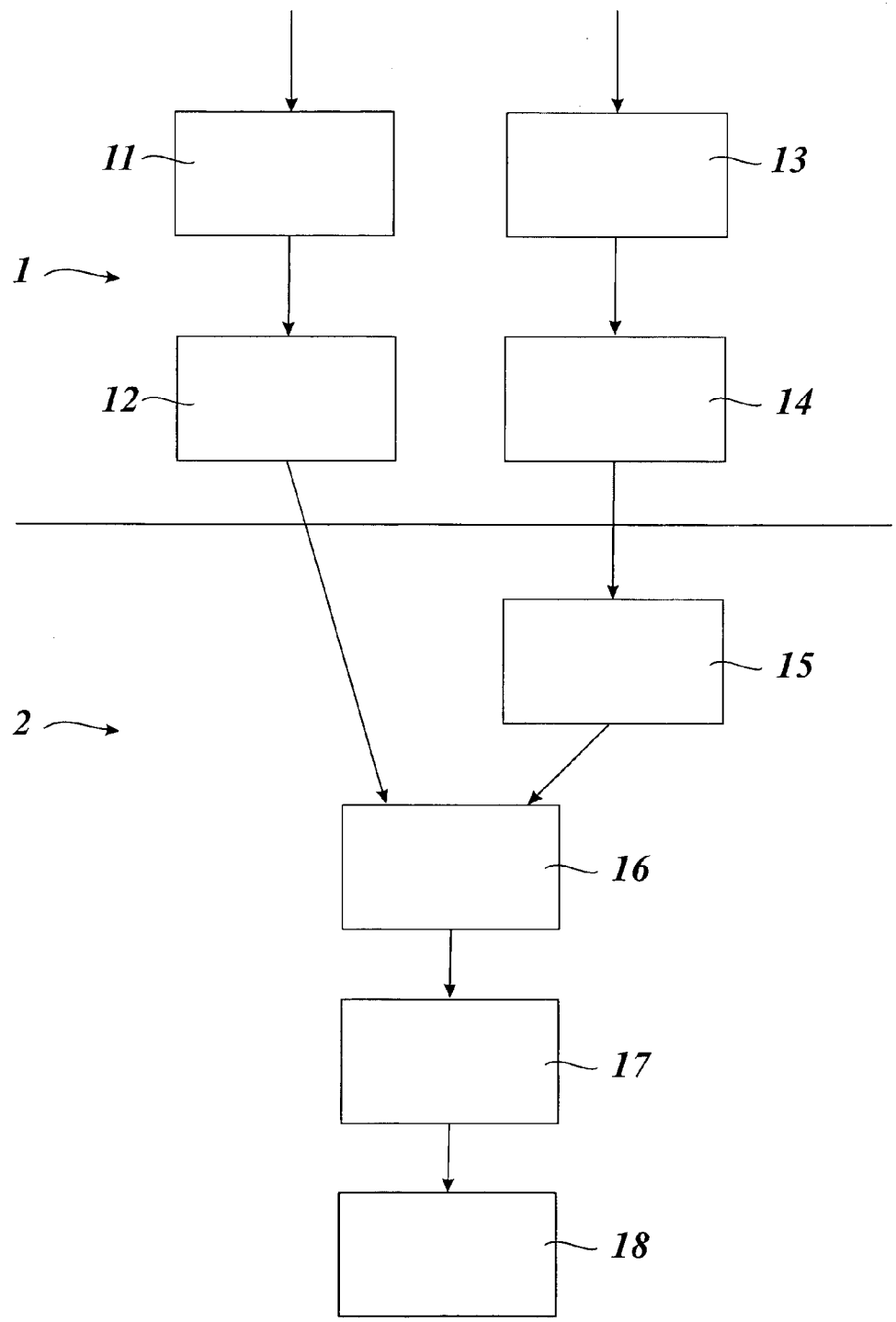
FIG. 1 shows a flow chart of a process for the production of a personalised, optically variable element.

FIG. 1 shows a flow chart of a process for the production of a personalised, optically variable element comprising a plurality of process steps 11 to 18. In this case the individual process steps 11 to 18 are described hereinafter with reference to accompanying FIGS. 2a to 5. Process steps 11 to 14 represent process steps in a central sub-process 1 and process steps 15 to 18 represent process steps in a decentral sub-process 2. The central sub-process 1 leads to the provision of film bodies and substrate bodies, from which a personalised, optically variable element is then generated in the decentral sub-process 2.

The process steps of the central sub-process 1 are carried out in industrial manufacturing procedures.

Figure 2A:
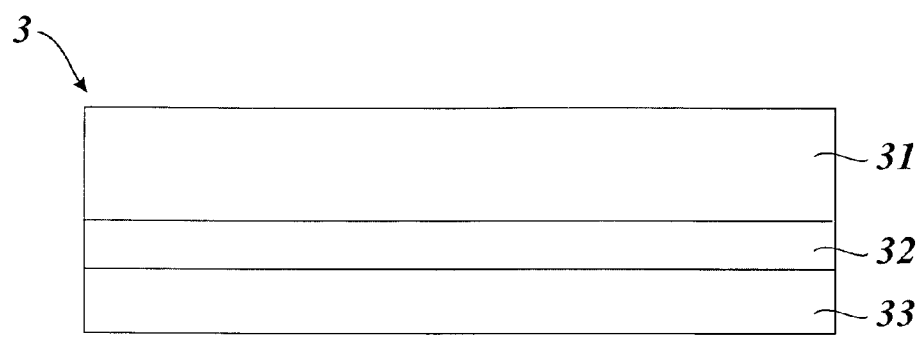
FIG. 2a shows a diagrammatic view of a film body.

A film body 3 as shown in FIG. 2a with three layers 31, 32 and 33 is produced by means of the process steps 11 and 12. The film body 3 is a stamping film. The film body 3 however can also be a laminating film or a sticker film.

The film body 3 has three layers 31, 32 and 33. The layer 31 is a carrier layer formed for example by a polyester film of a thickness of 19 μm to 23 μm. The layer 32 is applied to the carrier layer 31 in the process step 11 for example by means of an intaglio printing process. The layer 32 is an LCP layer (LCP=liquid crystal polymers) comprising a liquid crystal material which hardens by radiation or otherwise. The liquid crystal materials described in U.S. Pat. No. 5,389,698 A, U.S. Pat. No. 5,602,661 A, EP 0 689 084 A, EP 0 689 065 A1, WO 98/52077 and WO 00/29878 can be used as the liquid crystal material. Preferably in that respect Merck RMM 129 or OPALVA® (Vantico-Basel) is used as the liquid crystal material for the layer 32.

In that respect the liquid crystal material is preferably applied to the carrier film 31 in an application weight of 0.5 to 3 g/m². Then in process step 12 physical drying of the solvent-bearing LCP material of the layer 32 is effected. Drying is effected in that case for example in a drying passage at a temperature of 100 to 120° C.

It is also possible in that respect for the LCP layer 32 to be applied to the layer 31 not over the full surface area but in a partial pattern-like configuration, by means of a suitably shaped intaglio gravure cylinder. It is possible in that way to already provide in the LCP layer which has not yet been personalised, a complex pattern which can serve as an additional security feature.

The layer 33 is then applied to the dried layer 32. The layer 33 is a silicone paper which protects the sticky surface of the LCP layer 32.

It is also possible to provide a release and/or protection lacquer layer between the layers 31 and 32, to ensure better release of the carrier layer 31 from the LCP layer 32 or physical protection for the layer 32.

Figure 2B:
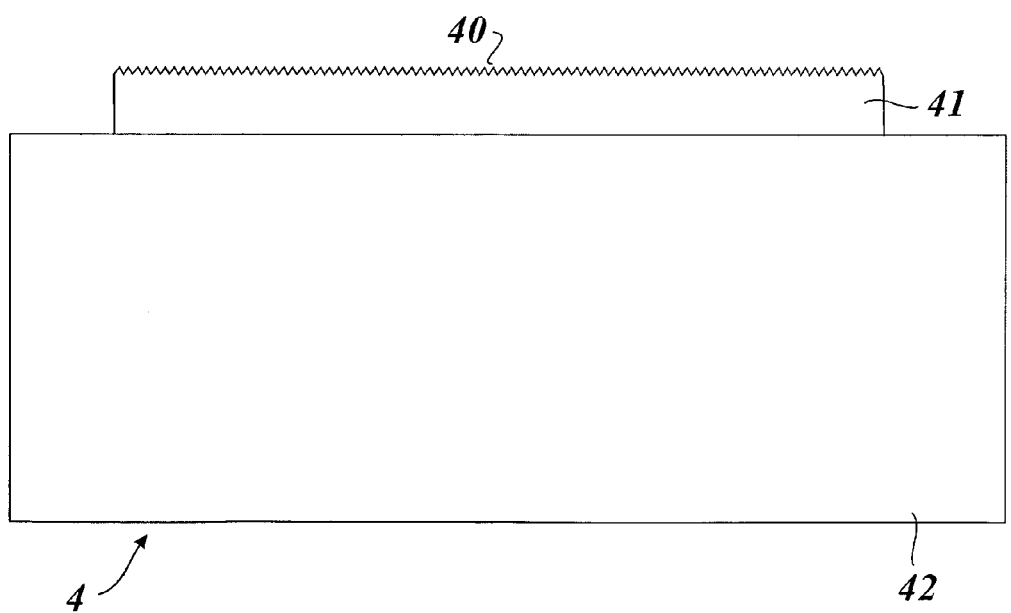
FIG. 2b shows a diagrammatic view of a substrate body.

A substrate body 4 shown in FIG. 2b is produced by means of the process steps 13 and 14. The substrate body 4 is a sticker film which naturally can have still further layers. The substrate body 4 however can also be a stamping or laminating film.

The substrate body 4, that is to say the layer 42, can also be already directly structured (for example by laser ablation). In addition the substrate body 4 can also be formed by a PCV card.

The substrate body 4 has an orientation layer 41 with a relief structure 40 and a carrier layer 42.

The carrier layer 42 is for example a PET or BOPP film of a layer thickness of 10 µm to 50 µm. The orientation layer 41 is applied to the carrier film 42 in the process step 13 over the full surface area, for example with an intaglio gravure cylinder.

The layer 41 is a replication layer in which the relief structure 40 is embossed by means of a stamping tool. The layer 41 in that case preferably comprises a transparent thermoplastic material. For example the replication lacquer used for the layer 31 is of the following composition:

| Component | Parts by weight |
|---|---|
| High-molecular PMMA resin | 2000 |
| Silicone alcyl, oil-free | 300 |
| Non-ionic wetting agent | 50 |
| Low-viscosity nitrocellulose | 750 |
| Methyl ethyl ketone | 1200 |
| Toluene | 2000 |
| Diacetone alcohol | 2500 |

That replication layer is applied for example by means of a line grid intaglio printing cylinder in an application weight of 2.2 g/m² after drying. Drying is effected in the drying passage at a temperature of 100 to 120° C.

Now, in process step 14, the relief structure 40 serving for orientation of liquid crystals is embossed in the layer 41 at about 130° C. by means of a die comprising for example nickel. When stamping the relief structure 40 the die is preferably electrically heated. Prior to upon lifting off the die from the layer 41 after the stamping operation the die can be cooled down again. After the operation of stamping the relief structure 40 the replication lacquer hardens by cross-linking or in some other fashion.

Here for example the relief structure 40 comprises a plurality of parallel grooves which are arranged in mutually juxtaposed relationship and which permit orientation of liquid crystal molecules. In this case the spatial frequency of the relief structure 40 is preferably 300 to 3000 lines/mm and the profile depth of the grooves is preferably 200 nm to 600 nm.

It is however also possible for the orientation layer 41 to be formed by an exposed photopolymer layer. In principle it is possible for that purpose to use all photopolymers whose orientation properties can be established by irradiation with polarised light. Examples of such photopolymers (LPP=Linearily Photopolymerisized Polymeres) are described for example in EP 0 611 786 A, WO 96/10049 and EP 0 763 552 A. In addition the photopolymers described in EP 1 227 347 A1 can also be used for that purpose.

The photopolymer layer is applied to the carrier layer 42 in the process step 13 by means of a wet-chemical process. Preferably in that case the operation of applying the photopolymer layer is effected by means of an intaglio printing process. The photopolymer layer is then dried and exposed with polarised UV light in the process step 14 so that the relief structure 40 is produced in the orientation layer 41, which permits orientation of liquid crystal molecules.

In this case it is also possible for the orientation layer 41 to be already printed in a pattern configuration on the carrier layer 42 in order in that way to already apply a complex pattern operating as a further security feature to the orientation layer 41, prior to personalisation of the orientation layer. In addition it is also possible to achieve an effect of that kind by suitable recess shaping of the relief structure 40.

A personalised, optically variable element is now produced in the decentral sub-process 2 decentrally and with the assistance of simple apparatuses by means of the substrate body 4 and the film body 3.

For that purpose the orientation layer 41 of the substrate body 4 is personalised in the process step 15.

Figure 3A:
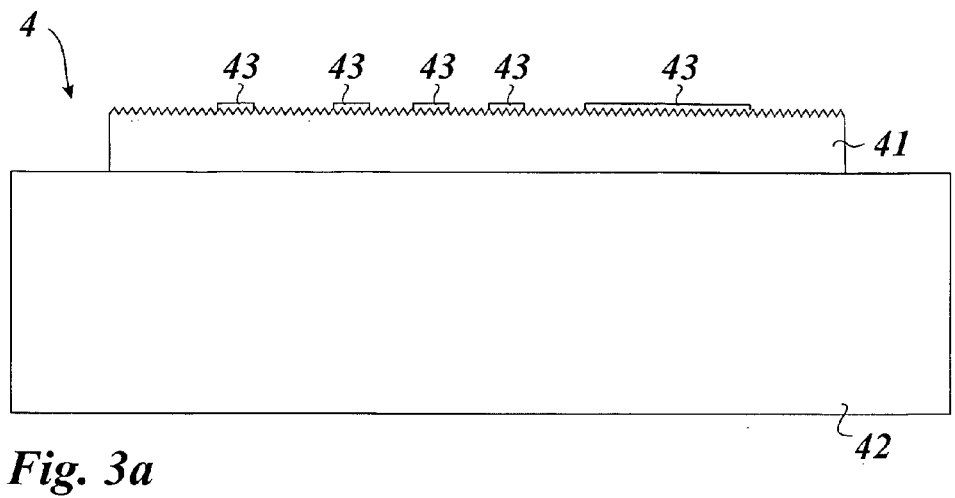
FIG. 3a shows a diagrammatic view of a substrate body with a personalised orientation layer.

A first possible way of personalising the orientation layer 41 is described hereinafter with reference to FIG. 3a:

FIG. 3a shows the substrate body 4 with the carrier layer 42 and the orientation layer 41. Applied region-wise to the orientation layer 41 is a print layer 43 which fills up the grooves of the relief structure 40. Coloured or colourless printing of that kind, for example by means of a TTF printer or an ink jet printer, provides that regions of the orientation layer 41 are covered or extinguished by filling in specifically targeted fashion. No alignment of the liquid crystal material later occurs in the regions of the photopolymer which are deactivated by the printing or in the surface structure regions which are filled by the printing so that isotropic distribution of the liquid crystal molecules prevails in those regions. Under the polariser, 'YES/NO' information is obtained in the non-printed regions by virtue of the orientation of the liquid crystal material, while in the regions which are deactivated or filled by printing the liquid crystals do not involve any preferred orientation and thus do not have any optically active information.

Personalisation of the orientation layer 41 can be effected in a similar manner by the orientation layer 41 being partially (in part) removed. Thus in the process step 15 the relief structure 40 can be partially removed for example by means of a milling head or other, material-removing tool, thereby subsequently producing in the region of material removal isotropic distribution of the liquid crystal molecules and thus extinction of the optical information. Extinction of that kind can also be achieved by thermal removal, for example by means of a laser.

A further possible option involves partially retro-shaping the relief structure 40 by partial thermal processing of the surface of the orientation layer 41, and thus partially extinguishing the liquid crystal-orienting properties of the relief structure.

In addition it is also possible to use an LPP layer which is not exposed or only partially exposed, as the orientation layer 41, and then to personalise that layer in process step 15 by means of one or more exposure steps. In that case that process can also be combined with the process described in relation to FIG. 3a so that for example a photopolymer layer which is not exposed or only partially exposed is firstly printed upon with a layer preventing subsequent orientation by coating, and is then irradiated with polarised light.

In addition it is possible for the relief structure 40 of the orientation layer 41 to be partially cancelled by means of a stamping punch. Besides straightforward extinction of the relief structure 40 that stamping punch can additionally also emboss a new relief structure which is of a different orientation, in the orientation layer 41. It is then also possible in that way to produce regions with liquid crystal molecules of a different orientation.

If necessary an LC-based with contrast change can also be generated by combination with a retarder layer which has polarising properties. In that case the retarder layer can be part of the substrate body and for example can be arranged directly beneath the orientation layer 41. It can also be part of the part of the film body 30, which remains on the substrate body, and can be arranged for example directly above the LCP layer 32.

The retarder layer is formed for example by an additional, suitably oriented and fixed LC layer. The retarder layer however can also be a layer of a suitable carrier material which exhibits birefringence for polarised light, that is to say it has different refractive indices in dependence on direction. Thus the retarder layer can for example also be formed by the carrier layer 42 if the latter is made from a suitable material. Furthermore the retarder layer can also be made from another material which has polarising or polarisation-dependent properties.

The polarisation effect generated by the oriented LC layer 32 and the polarisation effect generated by the retarder layer are superimposed so that, in the regions in which the LC layer 32 does not have any polarising properties by virtue of the personalisation of the orientation layer 41, polarisation of the light is determined by the retarder layer, and otherwise polarisation of the light is determined by the properties of the retarder layer and the LC layer 32. The polarisation direction of the retarder layer is now preferably so selected that it is at a 45° angle relative to the orientation layer of the liquid crystal molecules. The additional retarder layer which is disposed for example in the form of a transparent overlay over the partially oriented LC layer provides that optically active information ('light/dark' effect) is also generated in the regions of the orientation layer, which are deactivated by personalisation. In conjunction with the 'YES/NO' information by the LC layer, that therefore affords an LC-based element which, viewed with a polariser, with rotation of the polariser, exhibits a contrast change. In that case the LC elements which are combined with a retarder layer can be of a reflective or transmissive nature.

A further possible form of personalisation of the orientation layer 41 is now described with reference to FIGS. 3b and 3c. In that respect, in the process shown in FIGS. 3b and 3c, individual orientation of the orientation layer 41 is achieved by partial transfer of a further, already pre-oriented photopolymer layer or replication layer on to the orientation layer 41.

Figure 3B:
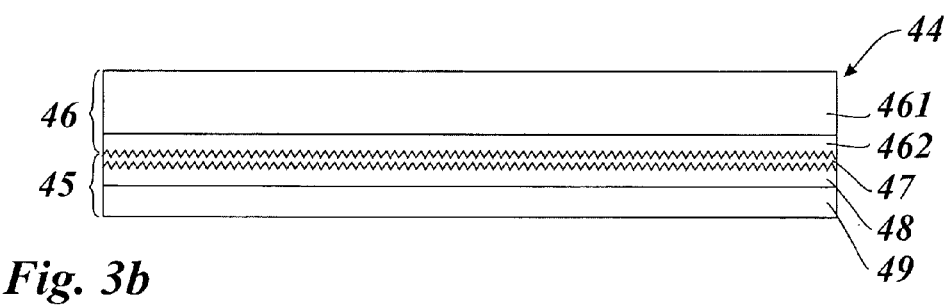
FIG. 3b shows a sectional view of a transfer film for the personalisation of an orientation layer of a substrate body.
Figure 3C:
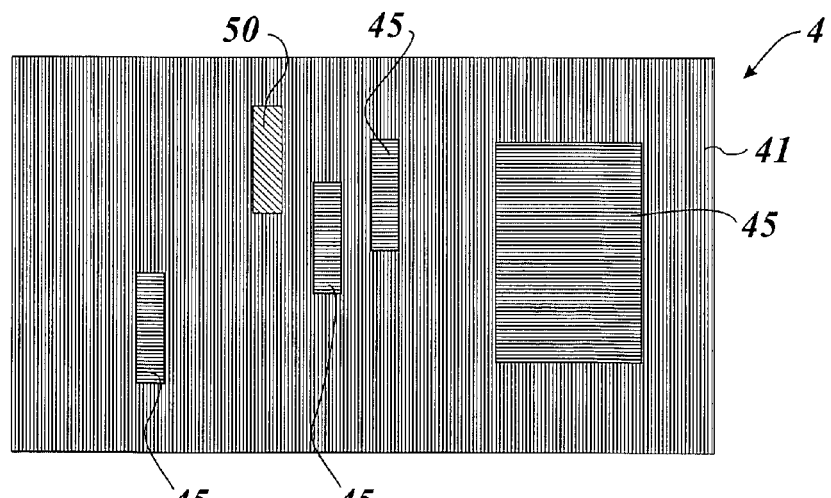
FIG. 3c shows a diagrammatic view of a personalised orientation layer.

FIG. 3b shows a transfer film 44 with a carrier 46, a release layer 47, a replication layer 48 and an adhesive layer 49.

The carrier 46 comprises a carrier film 461 and a replication lacquer layer 462 with a replicated structure.

The replication layer 41 is shaped for example like the replication layer described with reference to FIG. 2b and has an embossed relief structure which permits orientation of liquid crystal molecules. The adhesive layer 49 is for example a thermally activatable adhesive. The transfer film 44 is now applied partially to the orientation layer 41 for example by means of a suitable stamping punch. Thus FIG. 3c shows the substrate body 4 with the orientation layer 41, to which the transfer film is applied, in regions 45, in an orientation which is perpendicular to the orientation of the orientation layer 41 and in a region 50, in a direction which is turned through 45° relative to the orientation of the orientation layer 41. The carrier film 46 is removed after application of the transfer film 44 so that in the regions 45 and 50 the relief structure of the replication layer 48 forms the operative surface structure. As can be seen from FIG. 3c, regions involving a differing orientation of the orientation layer can be individually produced by partial application of that kind of a further orientation layer. In that way it is also possible to produce images with contrast reversal.

Instead of a replication layer with an embossed relief structure it will be appreciated that it is also possible to use an exposed photopolymer layer for the layer 48.

Figure 4:
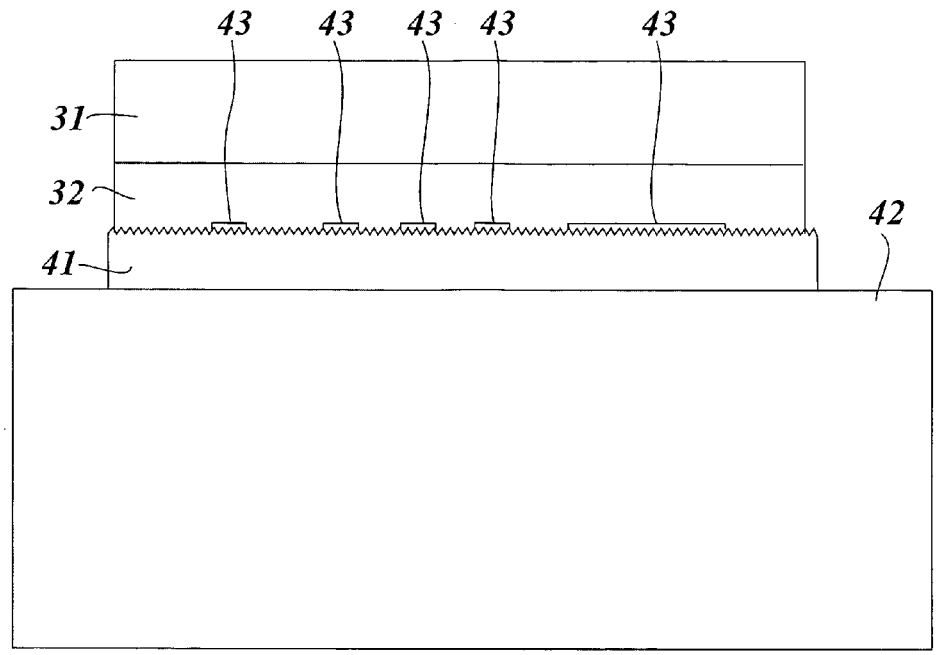
FIG. 4 shows a diagrammatic view of a substrate body with a film body applied thereto.

The film body 3 is now applied to the substrate body 4 in the process step 16. For that purpose the protection layer 33 comprising silicone paper is pulled off the film body 3 and then the remaining film body is counter-laminated on to the substrate body 44. The good adhesive capability of the physically dried LCP layer 32 here already affords a stable join between the substrate body and the film body without further measures being involved. FIG. 4 shows the film body which is afforded after implementation of process step 16. The film body has the carrier layer 42, the orientation layer 41 with the partial print layer 43, the LCP layer 32 and the carrier layer 31.

Now, heat is supplied to the multi-layer body shown in FIG. 4 in process step 17 in order to effect orientation of the liquid crystal molecules of the LCP layer 32 at the personalised orientation layer 41. The LCP layer 32 liquefies under the application of heat so that alignment of the liquid crystal molecules of the LCP layer 32 can take place at the personalised orientation layer 41.

The LCP layer 32 which is now oriented is exposed with UV light through the carrier layer 31 in the process step 18. Preferably UV light in a wavelength range of 280 to 365 nm is used for the exposure operation. That UV exposure provides for UV fixing of the liquid crystal material.

In that case the carrier prevents inhibition by oxygen so that radiation hardening which is usually necessary when dealing with LCPs under inert conditions is eliminated.

Figure 5:
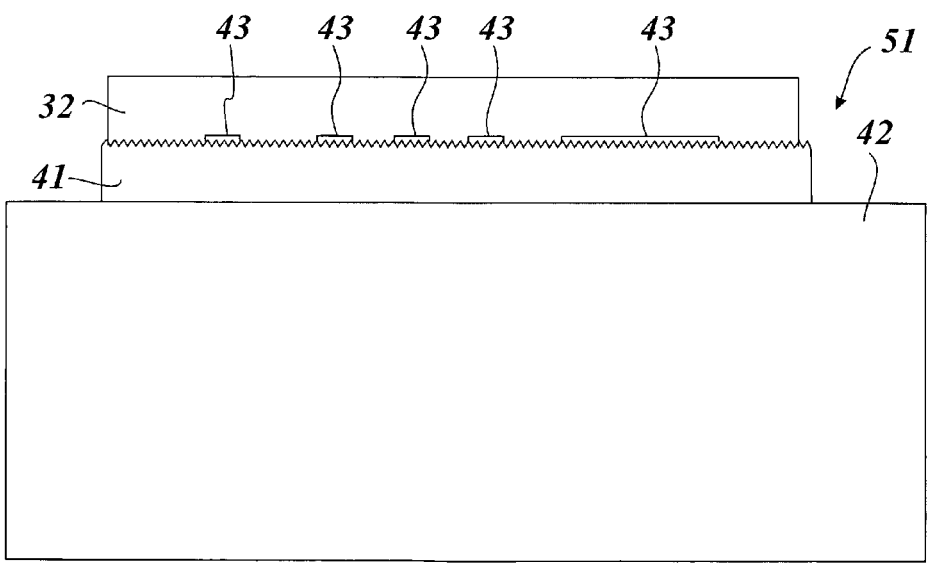
FIG. 5 shows a diagrammatic view of an optically variable element.

After UV fixing of the LCP layer 32 the carrier layer 31 is pulled off the multi-layer body, thus giving the optically variable element 51 shown in FIG. 5 with the carrier layer 42, the personalised orientation layer 41 with the partial print layer 43 and the oriented LCP layer 32.

It is also possible for the carrier layer 31 to be left on the LCP layer 32 and to serve for example as a protection layer for protecting the LCP layer 32.

Further embodiments of a film system according to the invention will now be described with reference to FIGS. 6a and 6b.

Figure 6A:
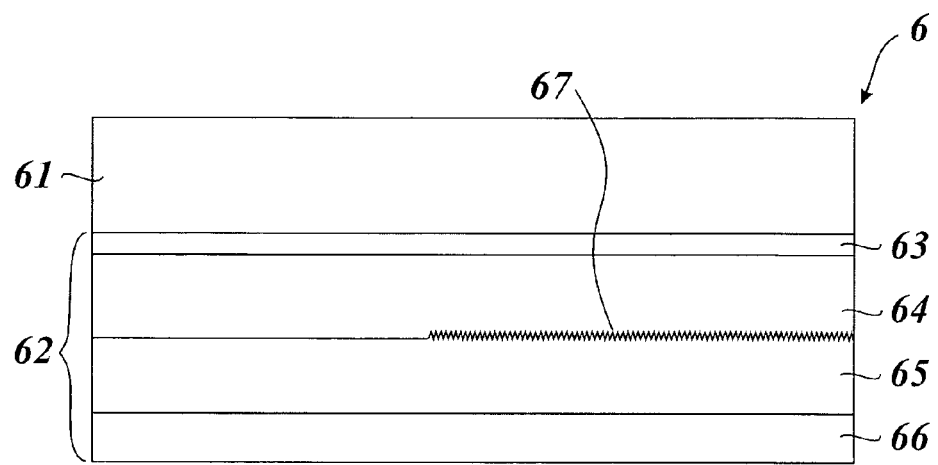
FIG. 6a shows a diagrammatic view of a film body for a further embodiment of the invention.

FIG. 6a shows a film body 6 having a carrier layer 61 and a transfer layer 62 which has a release and protection lacquer layer 63, a replication layer 64, an LCP layer 65 and a protection layer 66. The carrier layer 61, the LCP layer 65 and the protection layer 66 are like the layers 31, 32 and 33 shown in FIG. 2a.

The layer 64 is a replication layer in which a diffractive structure 67 is embossed region-wise. In this case the materials used for the layers 64 and 65 differ in respect of their refractive index so that a transparent, optical-diffraction security feature is produced by the diffractive structure 67. Thus it is possible for example for a hologram or a Kinegram® to be produced by the diffractive structure 67.

Figure 6B:
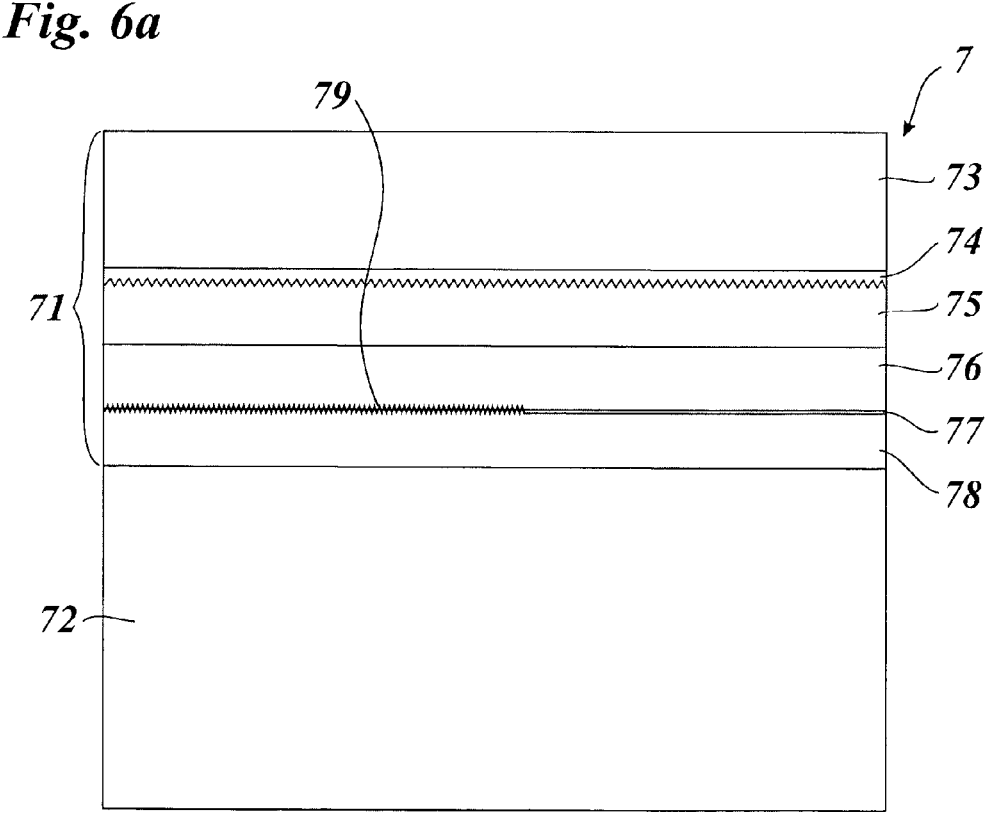
FIG. 6b shows a diagrammatic view of a security document with a substrate body for a further embodiment of the invention.

FIG. 6b shows a security document 72 formed for example by a (printed) plastic and/or paper body. A security document of that kind can be used for example as a pass, identity card, corporate identity card, credit card, charge card or ticket.

In addition FIG. 6b shows a substrate body 71 which is applied to the security document 72. The substrate body 71 has a carrier layer 73, a release layer 74, an orientation layer 75, a replication layer 76, a reflection layer 77 and an adhesive layer 78.

The carrier layer 73 is like the carrier layer 31 shown in FIG. 2a. The orientation layer 75 is like the orientation layer 41 shown in FIG. 2b. The replication layer 76 is a replication layer in which a diffractive structure 79 is partially formed. The reflection layer 77 comprises a thin, vapour-deposited metal layer. Essentially chromium, aluminium, copper, iron, nickel, silver, gold or an alloy involving those materials can be used as the material for the metal layer. Furthermore the reflection layer 77 can also be an HRI layer (HRI=high refraction index).

Accordingly a reflective security element having an optical-diffraction effect, for example a hologram or a Kinegram® is produced in the region of the diffractive structure 79. It will be appreciated that it is also possible for the reflection layer 77 to be an only partial layer and thus for example to have in region-wise manner a transparent window for making elements of the security document 72 visible.

The adhesive layer 78 comprises for example a layer of a thermally activatable adhesive.

Now, in the central sub-process, the film body 6 is produced by application of the release/protection lacquer layer 63 to the carrier layer 61, applying a replication lacquer layer by printing, drying the replication lacquer layer and replication of the diffractive structure 67, applying the LCP layer 64 by printing and physical drying of the LCP layer 65, and application of the protection layer 66. Now, in the decentral sub-process, the substrate body 71 is applied to the security document 72 (optionally after personalisation of the security document 72). The carrier layer 73 together with the release layer 74 is then pulled off the substrate body 71 and the orientation layer 75 is personalised, as described in the description relating to FIGS. 3a to 3c. The protection layer 66 is then pulled off the film body 6 and the film body 6 is laminated with the layer 65 leading on to the layer 75 of the substrate body 71.

Further embodiments of film systems according to the invention will now be described with reference to FIGS. 7a and 7b.

Figure 7A:
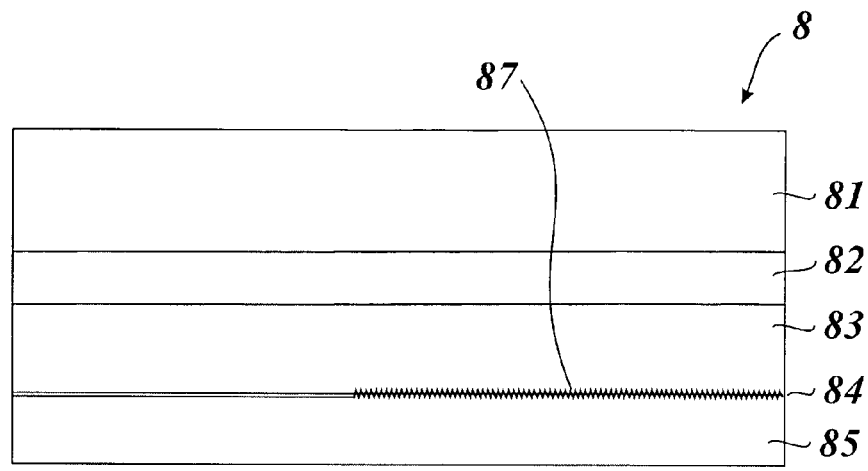
FIG. 7a shows a diagrammatic view of a film body for a further embodiment of the invention.

FIG. 7a shows a film body 8 with a carrier layer 81, an LCP layer 82, a replication layer 83, a reflection layer 84 and an adhesive layer 85.

The carrier layer 81, the LCP layer 82 and the replication layer 83 are like the layers 61, 65 and 64 shown in FIG. 6a. The reflection layer 84 and the adhesive layer 85 are like the layers 77 and 78 in FIG. 6b. A diffractive structure 87 is shaped region-wise in the replication layer 83 and affords a reflective optical security element.

Figure 7B:
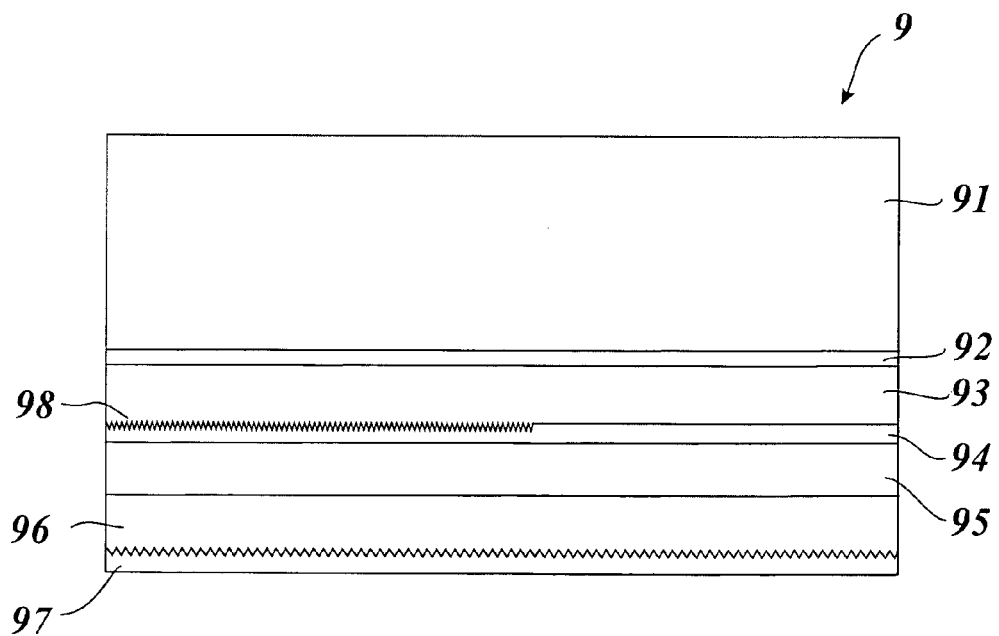
FIG. 7b shows a diagrammatic view of a substrate body for a further embodiment of the invention.

FIG. 7b shows a substrate body 9 which has a carrier layer 91, a release and/or protection lacquer layer 92, a replication layer 93, an absorption layer 94 and a spacer layer 95 of a thin film layer system, an orientation layer 96 and a protection layer 97. In this case the carrier layer 91, the replication layer 93 and the orientation layer 96 are like the layers 73, 76 and 75 shown in FIG. 6b. In a region the replication layer 93 has a diffractive structure 98 which, in the region of the diffractive structure, generates a transparent security element having an optical-diffraction effect. The thin film layer system comprises the absorption layer 94 and the spacer layer 95 and generates a transparent optical security element which produces colour shifts which are dependent on viewing angle, by means of interference.

The film body 8 and the substrate body 9 are produced in the central sub-process. Then, in the decentral sub-process, the substrate body 8 is glued with the adhesive layer 85 leading on to a security document. The carrier film 81 is then removed from the transfer layer. In the following step the protection layer 97 is removed from the orientation layer 96 of the substrate body 9 and personalised in accordance with one of the processes described with reference to FIGS. 3a to 3c. The substrate body 9 is then applied with the personalised orientation layer 96 leading to the LCP layer 82 of the film body 8 and the substrate body 9 is laminated on to the film body 8.

In that respect the optical security features produced by the structures 87 and 88 having an optical-diffraction effect represent mutually supplemental optical security features. By way of example those two diffractive structures produce adjacent regions of a common hologram representation.

What is claimed is:

1. A process for the production of a personalised, optically variable element having polarising properties, wherein to produce the optically variable element a film body which comprises two or more layers and which has an LCP layer comprising a liquid crystal material is applied to a substrate body which has an orientation layer for the orientation of liquid crystals, that the orientation layer of the substrate body is personalised prior to application of the film body to the substrate body, and that the film body is applied to the personalised orientation layer of the substrate body in such a way that the LCP layer of the film body lies on the personalised orientation layer of the substrate body for the orientation of liquid crystals of the LCP layer of the film body, wherein after the application of the film body to the personalised orientation layer the LCP layer is liquefied, oriented and solidified, wherein the orientation layer of the substrate body is personalised by partial printing on the orientation layer.

2. A process for the production of a personalised, optically variable element having polarising properties, wherein to produce the optically variable element a film body which comprises two or more layers and which has an LCP layer comprising a liquid crystal material is applied to a substrate body which has an orientation layer for the orientation of liquid crystals, that the orientation layer of the substrate body is personalised prior to application of the film body to the substrate body, and that the film body is applied to the personalised orientation layer of the substrate body in such a way that the LCP layer of the film body lies on the personalised orientation layer of the substrate body for the orientation of liquid crystals of the LCP layer of the film body, wherein after the application of the film body to the personalised orientation layer the LCP layer is liquefied, oriented and solidified, wherein the orientation layer of the substrate body is personalised by partial transfer of a differently oriented orientation layer on to the orientation layer of the substrate body.

3. A process for the production of a personalised, optically variable element having polarising properties, wherein to produce the optically variable element a film body which comprises two or more layers and which has an LCP layer comprising a liquid crystal material is applied to a substrate body which has an orientation layer for the orientation of liquid crystals, that the orientation layer of the substrate body is personalised prior to application of the film body to the substrate body, and that the film body is applied to the personalised orientation layer of the substrate body in such a way that the LCP layer of the film body lies on the personalised orientation layer of the substrate body for the orientation of liquid crystals of the LCP layer of the film body, wherein after the application of the film body to the personalised orientation layer the LCP layer is liquefied, oriented and solidified, wherein the orientation layer of the substrate body is personalised by partial mechanical removal of the orientation layer.

4. A process for the production of a personalised, optically variable element having polarising properties, wherein to produce the optically variable element a film body which comprises two or more layers and which has an LCP layer comprising a liquid crystal material is applied to a substrate body which has an orientation layer for the orientation of liquid crystals, that the orientation layer of the substrate body is personalised prior to application of the film body to the substrate body, and that the film body is applied to the personalised orientation layer of the substrate body in such a way that the LCP layer of the film body lies on the personalised orientation layer of the substrate body for the orientation of liquid crystals of the LCP layer of the film body, wherein after the application of the film body to the personalised orientation layer the LCP layer is liquefied, oriented and solidified, wherein the orientation layer of the substrate body is personalised by partial thermal deformation of the orientation layer.

5. A process according to claim 1, wherein the orientation layer of the substrate body is personalised by replication of a relief structure into the orientation layer.

6. A process according to claim 1, wherein the orientation layer of the substrate body is personalised by exposure of the orientation layer.

7. A process according to claim 1, wherein alignment of the liquid crystal material of the LCP layer of the film body is effected at the personalised orientation layer of the substrate body and wherein the aligned liquid crystal material of the LCP layer is then fixed.

8. A process according to claim 7, wherein the LCP layer of the film body is heated after application of the film body to the substrate body for alignment of the liquid crystals.

9. A process according to claim 7, wherein a stamping film, laminating film or sticker film is used as the substrate body.

10. A process according to claim 9, wherein the stamping film, laminating film or sticker film forming the substrate body is applied to a security document prior to application of the film body to the substrate body.

11. A process according to claim 1, wherein the substrate body has a carrier layer forming a security document.

12. A process according to claim 1, wherein the film body used is a stamping film, laminating film or sticker film which is applied to the substrate body in a hot stamping or laminating process.

13. A process for the production of a personalised, optically variable element having polarising properties, the process comprising:

personalizing an orientation layer of a substrate body, the orientation layer being capable of orienting liquid crystal material;

applying a film body comprising two or more layers and a LCP layer to the substrate body, wherein the LCP layer comprises a liquid crystal material, wherein said personalizing step precedes said applying step, said applying step including positioning the LCP layer directly onto the personalized orientation layer; and orienting the liquid crystal material in the LCP layer in response to said positioning step, whereby after the application of the film body to the substrate body, the LCP layer is liquefied, oriented and solidified.

14. A process according to claim 13, wherein said personalizing step comprises partial printing on the orientation layer.

15. A process according to claim 13, wherein said personalizing step comprises partial transfer of a differently oriented orientation layer on to the orientation layer of the substrate body.

16. A process according to claim 13, wherein said personalizing step comprises partial thermal deformation of the orientation layer.

* * * * *